(12) United States Patent
Grass et al.

(10) Patent No.: US 12,433,547 B2
(45) Date of Patent: Oct. 7, 2025

(54) PERFUSION IMAGING

(71) Applicant: KONINKLIJKE PHILIPS N.V., Eindhoven (NL)

(72) Inventors: Michael Grass, Buchholz in der Nordheide (DE); Roland Proksa, Neu Wulmstorf (DE); Sascha Krueger, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 189 days.

(21) Appl. No.: 15/535,443

(22) PCT Filed: Dec. 14, 2015

(86) PCT No.: PCT/EP2015/079596
§ 371 (c)(1),
(2) Date: Jun. 13, 2017

(87) PCT Pub. No.: WO2016/096729
PCT Pub. Date: Jun. 23, 2016

(65) Prior Publication Data
US 2017/0325755 A1    Nov. 16, 2017

(30) Foreign Application Priority Data
Dec. 17, 2014  (EP) .................................... 14198453

(51) Int. Cl.
*A61B 6/03*      (2006.01)
*A61B 5/00*      (2006.01)
(Continued)

(52) U.S. Cl.
CPC ................ *A61B 6/037* (2013.01); *A61B 5/00* (2013.01); *A61B 5/0077* (2013.01);
(Continued)

(58) Field of Classification Search
CPC ....... A61B 5/0077; A61B 6/504; A61B 6/481; A61B 6/4417; A61B 6/032; A61B 5/7285;
(Continued)

(56) References Cited

U.S. PATENT DOCUMENTS 7,496,175 B2    2/2009   Sakaguchi
8,340,744 B2    12/2012  Bredno
(Continued)

FOREIGN PATENT DOCUMENTS

CN    103584876 A    2/2014
JP    H10127596 A    5/1998

OTHER PUBLICATIONS

Smanio et al., "Value of Gating of Technetium-99m Sestamibi Single-Phonton Emission Computed Tomographic Imaging", Journal of the American College of Cardiology, vol. 30, No. 7, Dec. 1, 1997.

(Continued)

*Primary Examiner* — Anne M Kozak
*Assistant Examiner* — Aminah Asghar
(74) *Attorney, Agent, or Firm* — Larry Liberchuk (57) ABSTRACT

Perfusion data is generated from imaging a tissue of interest. The perfusion data includes image data of a contrast agent passing through the tissue of interest. A remote photoplethysmography (PPG) device is configured to focus on a patient's area at or near the tissue of interest. The PPG device is located on a gantry and remains stationary when an X-ray source rotates during a scanning operation. The PPG device is coupled to at least one processor and a memory for storing a remote PPG software. The at least one processor is configured to execute the remote PPG software to determine, based on skin color variations due to changing blood flow conditions, at least one blood pulsation parameter (Continued)

within a beam projecting on the tissue of interest. The blood pulsation parameter includes a phase of a cardiac cycle. The at least one processor is further configured to execute the remote PPG software to determine at least one perfusion-pulsation parameter based on the perfusion data and the blood pulsation parameter. The perfusion-pulsation parameter includes the perfusion data tagged with the phase of the cardiac cycle in which the perfusion data is acquired.

6 Claims, 4 Drawing Sheets (51) Int. Cl.
*A61B 5/024* (2006.01)
*A61B 6/00* (2024.01)
*A61B 6/50* (2024.01)
*G06V 10/141* (2022.01)
*G06V 10/56* (2022.01)

(52) U.S. Cl.
CPC ........ *A61B 5/02416* (2013.01); *A61B 5/7285* (2013.01); *A61B 6/032* (2013.01); *A61B 6/4417* (2013.01); *A61B 6/481* (2013.01); *A61B 6/504* (2013.01); *A61B 6/541* (2013.01); *G06V 10/141* (2022.01); *G06V 10/56* (2022.01); *G06V 2201/03* (2022.01)

(58) Field of Classification Search
CPC ....... A61B 5/02416; A61B 5/00; A61B 6/541; G06K 9/4652; G06K 9/2027; G06K 2209/05
See application file for complete search history.

(56) References Cited

U.S. PATENT DOCUMENTS

| | | | |
|---|---|---|---|
| 9,597,042 B2 | 3/2017 | Proksa | |
| 2003/0007593 A1* | 1/2003 | Heuscher | A61B 6/032 378/4 |
| 2004/0081270 A1* | 4/2004 | Heuscher | A61B 6/032 378/4 |
| 2009/0114825 A1* | 5/2009 | Beekman | G01T 1/1611 250/363.02 |
| 2011/0074409 A1 | 3/2011 | Stoughton | |
| 2011/0311119 A1* | 12/2011 | Jeanne | G06T 7/20 382/128 |
| 2012/0108946 A1* | 5/2012 | Kuhara | A61B 5/0037 600/410 |
| 2013/0039559 A1* | 2/2013 | Grass | G06T 7/32 382/131 |
| 2013/0058545 A1* | 3/2013 | Pearson, Jr. | A61B 6/468 382/128 |
| 2013/0274610 A1 | 10/2013 | Kamshilin | |
| 2014/0355735 A1* | 12/2014 | Choi | A61B 6/544 378/8 |
| 2015/0103969 A1* | 4/2015 | Flohr | G06T 5/50 378/4 |
| 2024/0081766 A1* | 3/2024 | Hendriks | A61B 5/0295 |

OTHER PUBLICATIONS

Rocha-Filho, et al., "Incremental Value of Adenosine-induced Stress Myocardial Perfusion Imaging with Dual-Source CT at Cardiac CT Angiography 1", Radiology, vol. 254, No. 2, Feb. 1, 2010.
Anonymous, "Guidelines to Prevent Excessive Heating and Burns Associated with Magnetic Resonance Procedures", Mar. 17, 2015.
Verkruysse, et al., "Remote plethysmographic imaging using ambient light" Optics Express, vol. 16, No. 26, Dec. 22, 2008.
Zheng, et al., "A remote approach to measure blood perfusion from the human face", Proceedings of SPIE, vol. 7169, Jan. 1, 2009.
Noonan, et al., "Accurate markerless respiratory tracking for gated whole body PET using the Microsoft Kinect", 2012 EEE Nuclear Science Symposium and Medical Imaging Conference, Oct. 1, 2012.
Sun Yu et al: "Noncontact Imaging Photoplethysmography to Effectively Access Pulse Rate Variability", Journal of Biomedical Optics, SPIE, 1000 20th St. Bellingham WA 98225-6705 USA, vol. 18, No. 6, (Oct. 30, 2012), pp. 61205-1-61205-9, XP060024187.

* cited by examiner

PERFUSION IMAGING

CROSS REFERENCE TO RELATED APPLICATIONS

This application is the U.S. National Phase application under 35 U.S.C. § 371 of International Application No. PCT/EP2015/079596, filed Dec. 14, 2015, published as WO 2016/096729 on Jun. 23, 2016, which claims the benefit of European Patent Application Number 14198453.4 filed Dec. 17, 2014. These applications are hereby incorporated by reference herein.

FIELD OF THE INVENTION

The present invention generally relates to a perfusion imaging device, a method for obtaining perfusion-pulsation parameters and a computer program product for determining perfusion-pulsation parameters.

BACKGROUND OF THE INVENTION

Computed tomography (CT), as well as other imaging modalities, is used, amongst others, for perfusion imaging. Generally, perfusion imaging is an imaging approach for capturing information corresponding to the passage of fluid (e.g., blood, lymph fluid, etc.) through anatomical tissue of interest (e.g. the brain, muscles or the cardiac area) and quantifying the information to facilitate identifying a health state of the tissue or other tissue. For example, myocardial perfusion imaging can be used to measure oxygen supply of muscle tissue in the heart. As such, the heart of a patient can be imaged in three dimensions (3D) before and during injection of radio-opaque contrast material, and the differences in the reconstructed images can be attributed to the contrast material that is washed into the tissue. Muscle tissue can then be classified according to the degree of contrast material uptake, and pathologies can be detected, for example, myocardial infarction or coronary occlusion.

Prospectively Electrocardiogram (ECG) gated CT has been used for perfusion imaging. With this technique a certain or particular cardiac phase (e.g., systole, diastole, etc.) is selected for the prospective gating. As such data acquisition may be performed consistently in a single pulsation state. This is important for perfusion scans, since a time point of each temporal frame of a perfusion image sequence may be acquired in the same cardiac phase. Moreover, repeated scans of a same patient which are acquired in different sessions can be made more consistent which is especially important for the quantitative analysis of signals over time.

However, a problem with ECG gated CT is that the motion states of the heart in the different time frames of the cardiac cycle may differ. This generally is due to the fact that the ECG gating relies on an electrical signal and not on the actual mechanical motion. Furthermore, the ECG probe is usually placed close to the tissue of interest. As a consequence, the ECG or imaging data may be influenced by incoming (x-ray) radiation (e.g. occurrence of hardening or other artifacts, physically blocking radiation emitted towards the tissue of interest or generation of electric signals within the probe due to absorbed radiation causing false or distorted data).

It would therefore be desirable to obtain consistent information about blood pulsation parameters, such as the cardiac phase during a perfusion imaging procedure without the need for using ECG gating.

SUMMARY OF THE INVENTION

Embodiments according to the present invention are directed to a perfusion imaging device comprising a medical imager comprising an imaging region for imaging a tissue of interest of a patient configured to generate perfusion data of at least the tissue of interest; a contactless blood pulsation parameter determiner configured to determine blood pulsation parameters on or near the tissue of interest without physical contact to the patient; and a perfusion phase parameter determiner that determines a perfusion phase parameter based on the perfusion data and the blood pulsation parameters. Such a system is capable to obtain reliable blood pulsation information without the need for placing a device, such as an ECG probe, in the imaging beam. In the context of the present invention the term 'contactless' means without direct physical contact to the patient, i.e. determining perfusion phase parameters without the use of a probe attached to or placed directly on the patient.

Preferably, the contactless blood pulsation parameter determiner comprises a skin image provider, such as an optical camera, and a skin image analyzer. The contactless blood pulsation parameter determiner preferably determines blood pulsation parameters based on skin color variations due to changing blood flow conditions, preferably based on remote photoplethysmography.

Preferably, the contactless blood pulsation parameter comprises a cardiac phase.

Further embodiments according to the present invention are directed to a perfusion imaging device according to any of the previous claims, wherein the medical imager is selected from a group comprising a computed tomography imager, a magnetic resonance imager, a positron emission tomography imager or a single-photon emission computed tomography. The present invention is particularly suitable for tomographic imagers, but is well-suited for non-tomographic imagers as well.

Further embodiments according to the present invention are directed to a method for obtaining perfusion-pulsation parameters comprising the steps of obtaining a medical scan image of an tissue of interest of a patient; determining perfusion parameters of the tissue of interest from the medical scan; contactless obtaining of blood pulsation parameters of the patient on or near the tissue of interest; and obtaining perfusion-pulsation parameters by linking the perfusion parameters and the blood pulsation parameters.

Preferably the steps of obtaining a medical scan image and contactless perfusion parameters are performed concurrently.

Preferably, the contactless obtaining of blood parameters comprises obtaining a skin image of a part of the patient's skin and/or the blood pulsation parameters comprise a cardiac phase and/or the blood pulsation parameter determiner are determined based on skin color-spectral variations due to changing blood flow conditions, preferably based on remote photoplethysmography.

The method preferably further comprises displaying at least one of the perfusion parameters, the blood pulsation parameters or the perfusion-pulsation parameters.

Preferably, the medical scan is obtained by a medical imager selected from a group comprising a computed tomography imager, an x-ray imager, a magnetic resonance imager, a positron emission tomography imager or a single-photon emission computed tomography.

Further embodiments according to the present invention are directed to a computer program product for determining perfusion-pulsation parameters when the computer program product is run on the computer comprising instructions to execute the steps of determining perfusion parameters from a medical scan; and determining perfusion-pulsation parameters by linking the perfusion parameters with contactlessly obtained blood pulsation parameters.

Further advantages and variations are addressed in the description of the embodiments. Still further aspects and embodiments of the present invention will be appreciated by those of ordinary skill in the art upon reading and understanding the following detailed description. Numerous additional advantages and benefits will become apparent to those of ordinary skill in the art upon reading the following detailed description of preferred embodiments.

BRIEF DESCRIPTION OF THE DRAWINGS

The present invention is illustrated by drawings of which
FIG. 3 shows embodiments of a gantry of a perfusion imaging device according to the present invention, in which
FIG. 3a shows an embodiment with one skin image provider mounted to the gantry and FIG. 3b shows an embodiment with two skin image providers mounted to the gantry.

The invention may take form in various components and arrangements of components, and in various process operations and arrangements of process operations. The drawings are only for the purpose of illustrating preferred embodiments and are not to be construed as limiting the invention. To better visualize certain features may be omitted or dimensions may be not be according to scale.

DETAILED DESCRIPTION OF EMBODIMENTS

The present invention is illustrated using CT as an example, but the invention is not limited to CT, but may be readily adapted to be suitable for other (tomographic and non-tomographic) imaging modalities, such as for instance x-ray, magnetic resonance (MR), positron emission tomography (PET) or single proton emission computed tomography (SPECT) imaging or combinations thereof.

Figure 1:
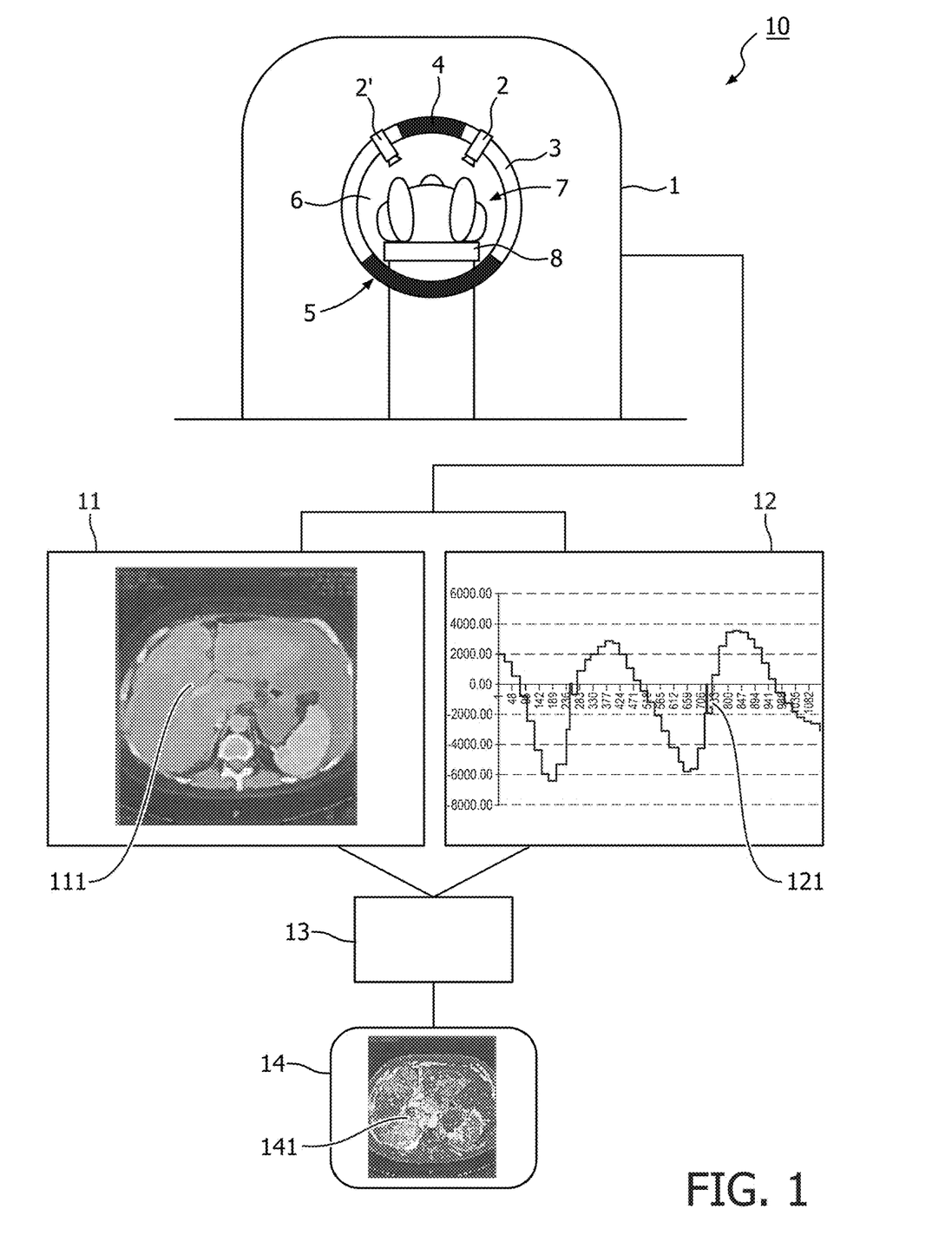
FIG. 1 shows an embodiment of a perfusion imaging device according to the present invention.

FIG. 1 shows an embodiment of a perfusion imaging device 10 according to the present invention. The perfusion imaging device 10 comprises a CT imaging system 1, with a gantry 3 that, when in use, rotates around an examination area 6. X-ray radiation is emitted from x-ray source 4 towards detector 5, both of which are mounted in the gantry opposite of each other. The x-ray radiation traverses the examination region 6 from the source 4 to the detector. When a subject to be imaged, such as a patient 7, is placed in the examination region 6, x-ray images can be obtained from every angle. Usually the patient lies on a patient support 8 that is moved through the examination region 6 during the imaging procedure, as such a three dimensional scan data of (part of) the patient 7 may be obtained. This scan data may then be further processed into a displayable image 111.

In perfusion imaging contrast agent passing through the tissue of interest 71 is analyzed. This could be time dependent tracking, wherein the tissue of interest 71 is imaged at various moments in time while the contrast agent passes through it or it could be determining the contrast agent perfusion in the tissue of interest 71 at a predetermined time (e.g. a specific time period after start of contrast agent flow). The contrast agent usually travels in a medium, such as blood or lymph fluid. This medium normally does not flow through a body at a constant speed, but is for instance propelled forward in pulses by the heart and therefore is submitted to the cardiac cycle. To be able to properly compare perfusion data taken at different moments, it is necessary to know the blood pulsation parameters at which the data was obtained. Such blood pulsation parameters may be the phase of the cardiac cycle in which the perfusion data was obtained, but also for instance of patient-specific or situational data such as his or her position, activity level and other parameters that may influence blood pulsation. As mentioned previously, this is commonly done by applying an ECG probe to the patient 7 and linking ECG data with the perfusion data.

As mentioned before having the ECG placed near or in the imaging beam may cause problems with the reliability. A common solution to this is to place the ECG on the patient at a location remote from the tissue of interest (e.g. on the patient's arm or leg). However, this has the drawback that the blood pulsation parameters are likely to be out of phase with those near the location of the tissue of interest, which is difficult to accurately correct. Furthermore, for physicians and supporting staff it is a common practice for other medical procedures to place the ECG probe near the tissue of interest for more reliable perfusion data.

The present invention is based on the insight that perfusion data would be more consistent and reliable if more or different information than the pure ECG information is available and that this could be achieved by using a contactless blood pulsation parameter determiner that determines the blood pulsation parameters on or near the tissue of interest, but which does not interfere with the medical scan.

The perfusion imaging device 10 of the present invention comprises a medical imager 1 that is configured to generate perfusion data. It further comprises a contactless blood pulsation parameter determiner that determines a blood pulsation parameter of the patient 7 without physical contact to the patient 7. The blood pulsation parameter is determined for the location of the tissue of interest 71 or a location 72 that is near to this. With the term 'near' it is meant in the context of this invention, that it might not be possible to determine the blood pulsation parameter at the exact location of the tissue of interest 71, e.g. because it is located inside the patient's body, but that it is determined in the immediate vicinity (e.g. on the skin above or beside the tissue of interest). At its broadest, the term 'near' encompasses anywhere on the patient's body the area that is within the examining beam 61. The blood pulsation parameter determiner may be a single device or an assembly of different devices or means, including a computer program product. A perfusion-pulsation parameter determiner determines a perfusion-pulsation parameter based on the perfusion data and the determined blood pulsation parameter. An example of a perfusion-pulsation parameter is for instance perfusion data tagged or imprinted with a cardiac cycle in which the perfusion data was acquired. As a result, by contactless measurement of the blood pulsation parameters, no blood pulsation determiner, such as an ECG probe or another device, needs to be physically present within the examining beam 61. Therefore, the influence from the blood pulsation parameter determiner on the medical scan is reduced or even completely eliminated, making the determined perfusion data more accurate, reliable and consistent.

In a preferred embodiment of the perfusion imaging device according to the present invention, the blood pulsation parameter determiner comprises a skin image provider 2, which provides an image of at least a part of a skin 72 of the patient 7, and a skin image analyzer 12 that is configured to analyze the provided skin image to determine a blood pulsation parameter from the skin image. Preferably the skin image provider 2 is an optical camera.

Figure 2:
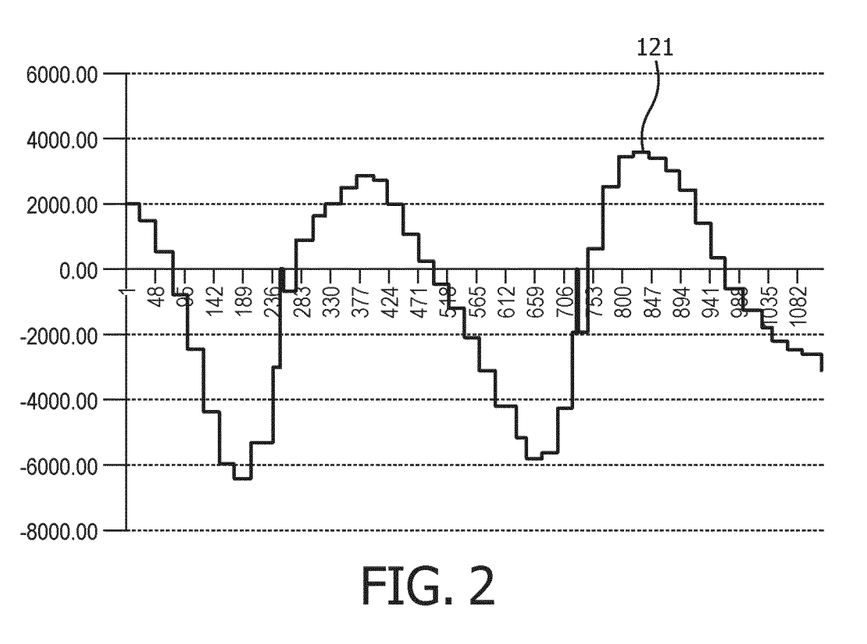
FIG. 2 shows an example of a blood pulsation signal obtained with a blood pulsation determiner.

The skin is particularly suitable for contactless determining of the blood pulsation parameter. Each time the patient's heart beats a new blood flow reaches the skin, leading to minute variations of a color of the skin. These variations are usually referred to as micro-blushes. While these micro-blushes cannot be observed by the human eye, a regular optical camera with a skin analyzer (e.g. dedicated software means) allows detection of micro-blushes by imaging light reflected from the skin. By providing skin images over time and recording the micro-blushes, cardiac cycle data is obtained. This method is called remote photoplethysmography (remote PPG). FIG. 2 depicts a graph 121 of a cardiac cycle recorded by remote PPG on a face of a human subject. The horizontal axis of the graph of FIG. 2 depicts time (in linear arbitrary units) and the vertical axis depicts skin color intensity (in arbitrary units). Cardiac blood pulsation parameters can be easily determined from this data and has shown good accuracy under stable light conditions for situations ranging from monitoring stationary subjects to monitoring during physical exercises. As an example, in perfusion CT imaging of the brain each temporal frame may be acquired in the same pulsation state. It is therefore advantageous that the pulsation of the blood in the patient's face is directly correlated to the pulsation in the head, and therefore the brain.

The remote PPG measurement does not interfere with the examination beam or with the patient's physiology and can be focused on a part of the skin that is as near to the tissue of interest as possible. As such, remote PPG is very suitable for use as contactless blood pulsation determination within the context of the present invention.

An alternate contactless pulsation determiner may be a temperature sensor that in some instances may be able to detect a cardiac pulse by measuring temperature variations.

Further alternate contactless pulsation determiners may be a breathing monitor, such as a sensor that remotely measures respiration (e.g. by detecting temperature differences in exhaled breath) or time-of-flight cameras that allow depth sensing.

A perfusion data determiner 11 determines perfusion data from obtained medical data 111. A perfusion-pulsation parameter determiner 13 combines perfusion data with blood pulsation parameters, for instance by recording the blood pulsation parameter with the perfusion data, selecting only perfusion data obtained at certain blood perfusion parameters (e.g. only perfusion data obtained in a particular cardiac phase). The perfusion data, optionally together with the pulsation data, may be displayed as a perfusion image 141 on a display unit 14. A physician may optionally select only perfusion images obtained at a target cardiac phase or other blood pulsation parameter. Furthermore, the obtained propulsion data may be used in a feedback loop to the imaging device, such that it will only obtain medical images of the tissue of interest if the heart is in a desired phase.

Figure 3:
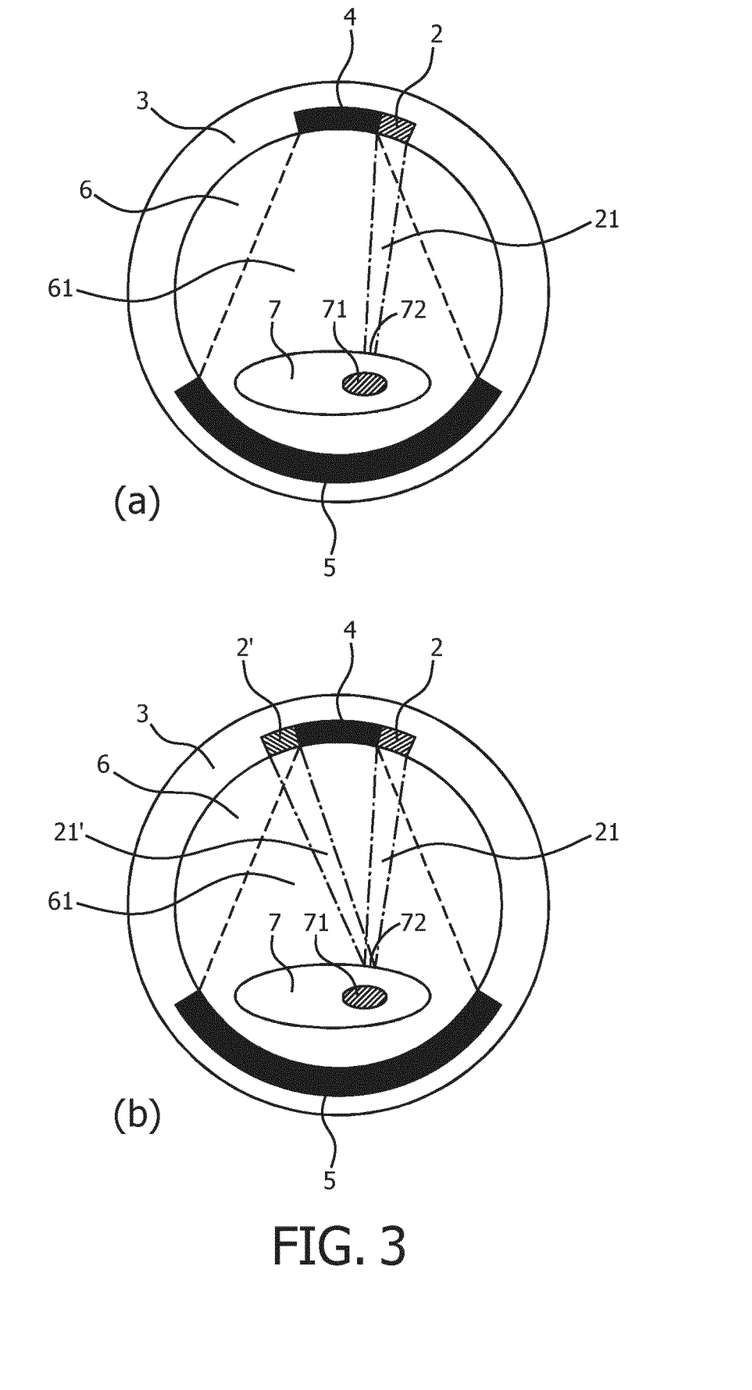

The schematic illustration in FIG. 3 shows two exemplary embodiments of a gantry 3 of a perfusion imaging device according to the present invention with a radiation source 4, a detector 5 and a contactless blood pulsation parameter determiner 2, 2' mounted in or on the gantry 3. FIG. 3a shows an embodiment with one contactless blood pulsation parameter determiner 2 with a determination beam 21, while FIG. 3b shows an embodiment with two contactless blood pulsation parameter determiners 2, 2', each with its own determination beam 21, 21'. In these examples the blood pulsation parameter determiners 2, 2' are focused on a part of the patient's skin 72 that is near the tissue of interest 71, in that it is located at the patient's skin that has the least distance to the tissue of interest 71. Even though one blood pulsation parameter determiner 2 will usually suffice to obtain suitable data, an advantage of using more than one blood pulsation parameter determiner 2, 2' is that each determines blood pressure parameters individually, which may be compared, averaged or otherwise used to obtain a more precise determination of blood pulsation parameters. Furthermore, if the part of the patient's skin 72 is temporarily obstructed from view for the medical imaging beam 61, there is still a back-up blood pulsation parameter determiner available for the determination. Additionally or alternatively, the system 10 may have means to automatically provide a warning in case of line-of-sight blockage or missing image content. The blood pulsation parameter determiners 2, 2' may be focused on the same part of the patient's skin 72 (as is depicted in FIG. 3b) or on different parts of the patient's skin 72 to obtain back-up or additional blood pulsation data. Of course it is possible to use even more contactless blood pulsation determiners.

The blood pulsation parameter determiners 2, 2' do not need to be attached to the source 4 and they do not need to rotate with the source. They can be part of the gantry 3 and just focus on a part of the patient's skin 72, e.g. on the face of the patient 7. Rotating blood pulsation parameter determiners 2, 2' would actually be below the table from time to time and thus not see the patient's skin 72.

Figure 4:
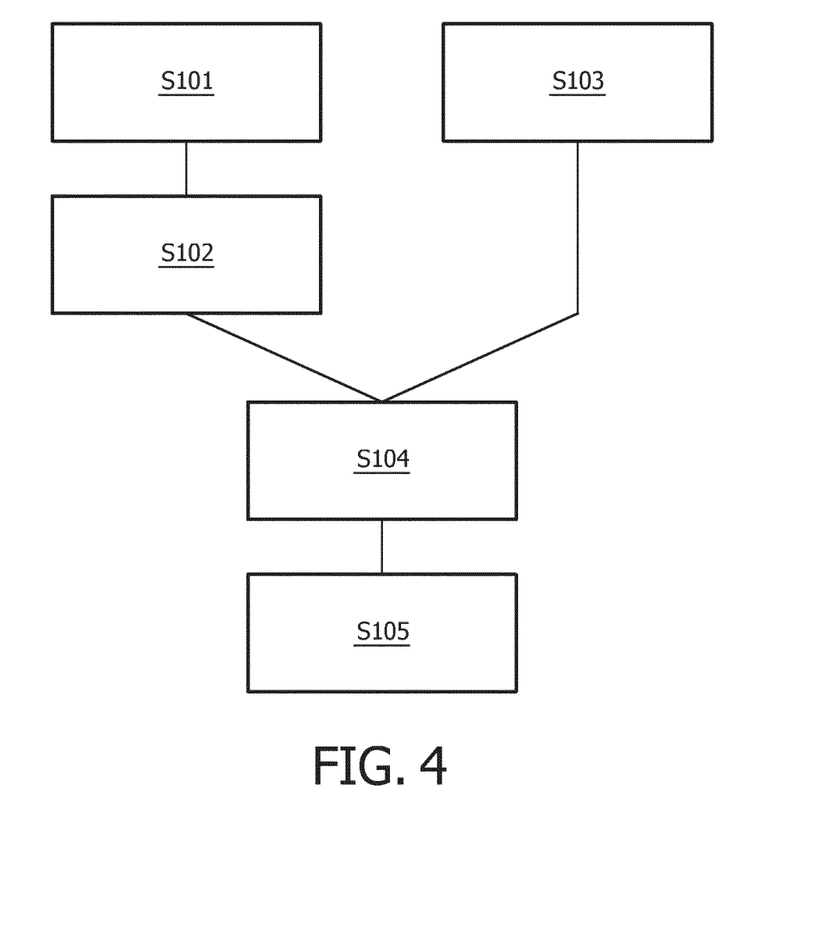
FIG. 4 shows a schematic depiction of a method for obtaining perfusion-pulsation parameters according to the present invention.

FIG. 4 depicts a schematic representation of a method for obtaining a perfusion-pulsation parameter. In step S101 a medical image of a tissue of interest 71 of a patient 7 is obtained. In step S102 perfusion parameters are determined from the medical scan. In step S103 blood pulsation parameters are obtained in a contactless way on a location on or near the tissue of interest. Preferably steps S101 and S103 are performed concurrently to obtain data that is temporarily matched. In step S104 the determined perfusion parameters and blood pulsation parameters are linked to obtain perfusion-pulsation parameters. In step S106 the perfusion parameters, pulsation parameters and/or perfusion-pulsation parameters may be displayed individually. The blood pulsation parameters obtained in step S103 may be fed back to the imaging device to allow for only performing subsequent steps S101 only when it has a predetermined or user-selected blood propulsion parameter value.

The determination steps of this method may be executed in a computer program product that comprises instructions to execute these steps when the computer program product is run on a computer.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. For instance, imaging devices equipped with optical cameras are known. These cameras are used to accurately determine a patient's position on the patient support 8 or to facilitate interventional procedures. The present invention could be implemented by adapting at least one of these optical cameras to be part of a blood pulsation parameter determiner (e.g. by adapting the camera requirements and coupling it to dedicated remote PPG software). Also, even though the present invention is explained using blood pulsation, it might be also adapted for other bodily fluids (e.g. lymph fluid or digestive fluids). Finally, the present invention may be used in place of ECG-assisted perfusion imaging, but could also be used alongside ECG-assisted perfusion imaging, for instance as a back-up or control for the other.

In the claims, the word "comprising" does not exclude other elements or steps, and the indefinite article "a" or "an" does not exclude a plurality.

A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A perfusion imaging system, comprising:
   a computed tomography (CT) device configured to generate perfusion data from imaging a tissue of interest, wherein the perfusion data includes image data of a contrast agent passing through the tissue of interest, wherein the CT device comprises a gantry and an X-ray source for projecting a beam on the tissue of interest;
   a remote photoplethysmography (PPG) device configured to focus on a patient's area at or near the tissue of interest, wherein the PPG device is located on the gantry and remains stationary when the X-ray source rotates during a scanning operation; and
   at least one processor and a memory for storing a remote PPG software, wherein the PPG device is coupled to the at least one processor and the memory, and wherein the at least one processor is configured to execute the remote PPG software to:
      determine at least one blood pulsation parameter within the beam projecting on the tissue of interest, wherein the at least one blood pulsation parameter is determined based on skin color variations due to changing blood flow conditions, wherein the blood pulsation parameter includes a phase of a cardiac cycle; and
      determine at least one perfusion-pulsation parameter based on the perfusion data and the blood pulsation parameter, wherein the perfusion-pulsation parameter includes the perfusion data tagged with the phase of the cardiac cycle in which the perfusion data is acquired.

2. The perfusion imaging system according to claim 1, further comprising an additional PPG device that is located on the gantry and remains stationary when the X-ray source rotates during the scanning operation, wherein the at least one processor is configured to perform a process based on the at least one blood pulsation parameter determined by the PPG device and at least one additional blood pulsation parameter determined by the additional PPG device.

3. The perfusion imaging system according to claim 1, wherein determining of the at least one blood pulsation parameter includes detection of micro-blushes.

4. A method for obtaining perfusion-pulsation parameters, comprising:
   obtaining a medical scan image of a tissue of interest of a patient;
   generating, by a computed tomography (CT) device, perfusion data of the tissue of interest from the medical scan image, wherein the perfusion data includes image data of a contrast agent passing through the tissue of interest, wherein the CT device comprises a gantry and an X-ray source for projecting a beam on the tissue of interest;
   focusing, by a remote photoplethysmography (PPG) device, on a patient's area at or near the tissue of interest, wherein the PPG device is located on the gantry and remains stationary when the X-ray source rotates during a scanning operation;
   providing at least one processor and a memory for storing a remote PPG software, wherein the PPG device is coupled to the at least one processor and the memory;
   determining, by the at least one processor when executing the remote PPG software, at least one blood pulsation parameter within the beam projecting on the tissue of interest, wherein the at least one blood pulsation parameter is determined based on skin color variations due to changing blood flow conditions, wherein the blood pulsation parameter includes a phase of a cardiac cycle; and
   determining, by at least one processor, at least one perfusion-pulsation parameter based on the perfusion data and the blood pulsation parameter, wherein the perfusion-pulsation parameter includes the perfusion data tagged with the phase of the cardiac cycle in which the perfusion data is acquired.

5. The method according to claim 4, further comprising:
   using an additional PPG device that is located on the gantry and remains stationary when the X-ray source rotates during the scanning operation; and
   performing a process based on the at least one blood pulsation parameter determined by the PPG device and at least one additional blood pulsation parameter determined by the additional PPG device.

6. A non-transitory computer-readable medium having one or more executable instructions stored thereon, which, when executed by at least one processor, cause the at least one processor to perform a method for obtaining perfusion-pulsation parameters, the method comprising:
   obtaining a medical scan image of a tissue of interest of a patient;
   generating, by a computed tomography (CT) device, perfusion data of the tissue of interest from the medical scan image, wherein the perfusion data includes image data of a contrast agent passing through the tissue of interest, and wherein the CT device comprises a gantry and an X-ray source for projecting a beam on the tissue of interest;
   focusing by a remote photoplethysmography (PPG) device on a patient's area at or near the tissue of interest, wherein the PPG device is located on the gantry and remains stationary when the X-ray source rotates during a scanning operation;
   determining, by the at least one processor when executing the remote PPG software, at least one blood pulsation parameter within the beam projecting on the tissue of interest, wherein the at least one blood pulsation parameter is determined based on skin color variations due to changing blood flow conditions, wherein the blood pulsation parameter includes a phase of a cardiac cycle; and determining, by at least one processor, at least one perfusion-pulsation parameter based on the perfusion data and the blood pulsation parameter, wherein the perfusion-pulsation parameter includes the perfusion data tagged with the phase of the cardiac cycle in which the perfusion data is acquired.

* * * * *